United States Patent Office 3,520,231
Patented July 14, 1970

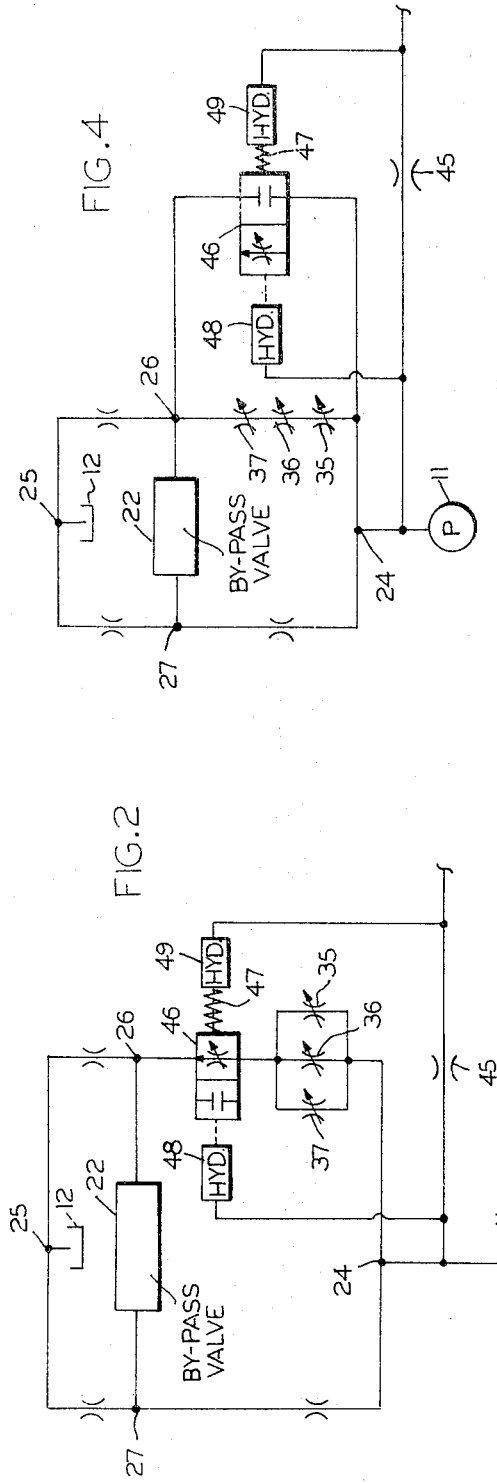

3,520,231
HYDRAULIC SUPPLY SYSTEMS WITH FLOW RATE-LIMITING CONTROL
Roland L. Genz, Waukesha, Wis., assignor to General Signal Corporation, a corporation of New York
Filed Oct. 23, 1968, Ser. No. 769,858
Int. Cl. F15b *11/16*
U.S. Cl. 91—414                                    7 Claims

ABSTRACT OF THE DISCLOSURE

Supply systems for hydraulically actuated loads which employ closed center distributing valves, and a separate fluid delivery control device which is positioned by a servo control that responds to actuation of the distributing valves. The fluid delivery control device is a by-pass valve in cases where the supply pump is of the fixed delivery type, and is the pump delivery control element in cases where a variable delivery pump is used. The servo control includes a hydraulic self-balancing Wheatstone bridge having command orifices in one of its legs whose flow areas are varied in response to actuation of the distributing valves. Auxiliary mechanism, which operates through the servo control, serves to limit the rate of supply to at least one of the distributing valves. This mechanism comprises a reference orifice in the supply connection of that valve, and a variable auxiliary orifice which is connected in the same leg of the bridge as the command orifices and is controlled in accordance with the pressure differential across the reference orifice. The supply rate to at least one other distributing valve may be limited to a higher value by delivering oil to it through the first reference orifice and a parallel-connected second orifice, and by providing means for blocking flow to the first valve through the second reference orifice.

BACKGROUND OF THE INVENTION

Co-pending application Ser. No. 642,436, filed May 31, 1967, now Pat. No. 3,411,295, discloses a supply system for hydraulically actuated loads which employs closed center distributing valves, a separate control device for varying the rate of delivery of fluid from the supply pump to the valves, and a position responsive servo control which alters the setting of the rate control device automatically in accordance with actuation of one of the valves. The rate control device is either a by-pass valve or a pump delivery control element, depending upon whether the pump is of the fixed or variable delivery type, but in all cases the servo control includes a self-balancing hydraulic Wheatstone bridge. One leg of the bridge contains a group of variable command orifices which are controlled by the distributing valves and, where more than one valve is employed, these orifices can be connected either in series or in parallel. When a distributing valve is actuated, the flow area of the associated command orifice is varied progressively to thereby unbalance the bridge and create a differential between the pressures at its output junctions. This differential is used to operate the rate control device. Rebalancing of the bridge is accomplished by a variable feedback orifice which is located in another leg and whose flow area is varied progressively by the rate control device as it moves to increase or decrease delivery rate.

In the system just described, the servo control causes the rate control device to progressively increase the supply rate to the distributing valves as a valve is moved from its neutral position to an operating position. In each case, regardless of whether the rate control device is a by-pass valve or a pump delivery control element, the maximum rate of supply to all distributing valves is the same. This is a disadvantage in installations where the distributing valves require different maximum flow rates in order to limit the speeds of movement of the hydraulic cylinders they control. An example of such an installation is a lift truck which employs a tilt cylinder which must be supplied with oil at a lower rate than the lift cylinder, and auxiliary cylinders, such as clamp actuators, which need a maximum flow rate intermediate that required for the other two cylinders.

SUMMARY OF THE INVENTION

The object of this invention is to provide an improvement in the system of Pat. No. 3,411,295 which permits independent selection of the maximum rates at which fluid is delivered to the various distributing valves. According to the invention, the command leg of the Wheatstone bridge is equipped with a variable auxiliary orifice whose flow area is controlled so as to limit to a predetermined value the pressure differential across a reference orifice interposed in the supply connection of the distributing valve which is to receive the limited flow rate. The parts are so arranged that, as the pressure differential across, and consequently the flow rate through, the reference orifice tends to increase above said predetermined value, the setting of the auxiliary orifice is changed to unbalance the pressures at the output junctions of the bridge in a sense that causes the delivery control element to reduce the rate at which oil is delivered from the source to the distributing valve. In this way, the improvement limits the supply rate to a substantially constant value.

In installations wherein several distributing valves require different maximum flow rates, all of which are less than the capacity of the source, each valve is connected with the source through a supply connection containing a reference orifice, and the downstream sides of the reference orifices are interconnected in such manner that the distributing valves receive oil through different numbers of said orifices. For example, if the system includes two such valves, the one requiring the lower limited flow rate is supplied exclusively through its supply connection, and the other is supplied through parallel paths consisting of both supply connections. In every case, one reference orifice is common to the supply paths of all the distributing valves whose supply rates are to be limited, and the auxiliary orifice is controlled in accordance with the changes in pressure differential across the common reference orifice. The flow rate represented by the limiting value of this pressure differential depends upon which of the distributing valves is in operation, since this determines how many of the parallel-connected reference orifices are being used. Therefore, a single auxiliary orifice and associated control can be employed to establish a plurality of different maximum supply rates.

BRIEF DESCRIPTION OF THE DRAWINGS

The preferred embodiment of the invention is described herein with reference to the accompanying drawings in which:

FIGS. 2 and 3 are more generalized schematic diagrams showing the flow-limiting schemes used with parallel-connected command orifices.

FIGS. 4 and 5 are diagrams similar to FIGS. 2 and 3 showing the flow-limiting schemes used with series-connected command orifices.

DESCRIPTION OF PREFERRED EMBODIMENTS

Figure 1:
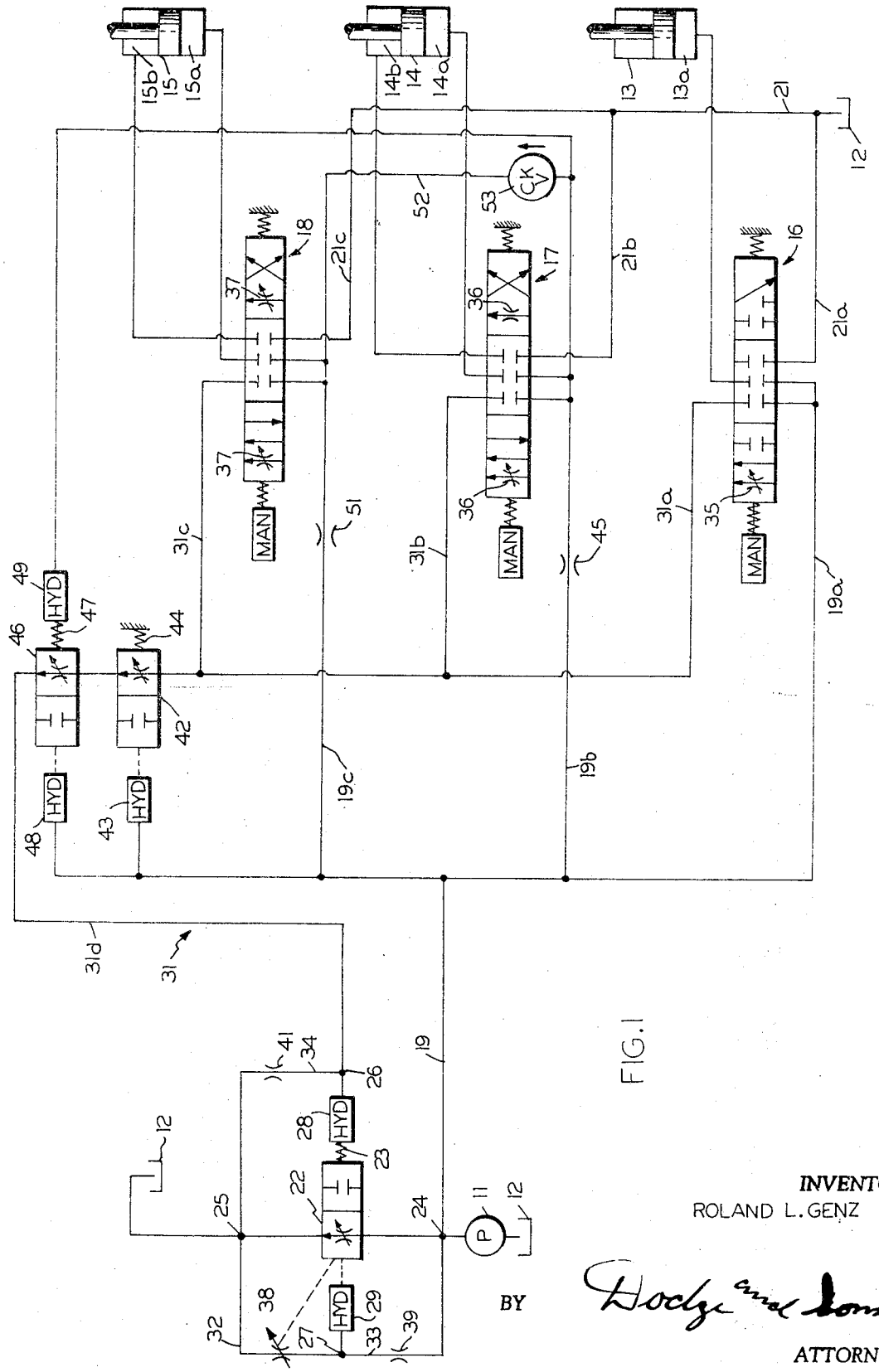
FIG. 1 is a schematic diagram of a representative version of the improved system.

The improved supply system shown in FIG. 1 employs a fixed delivery supply pump 11 which is arranged to draw oil from a tank 12 and deliver it under pressure to three cylinders 13–15 which are under the control of a corresponding number of closed center distributing valves 16–18, respectively. The cylinders 13–15 may, for example, represent the lift, tilt and clamp cylinders, respectively, of a lift truck. The distributing valves are manually operable, three-position units which are connected in a parallel circuit by the branches 19a, 19b and 19c of supply conduit 19, and by the branches 21a, 21b and 21c of exhaust conduit 21. Each distributing valve has a neutral or hold position, toward which it is biased by a centering spring, and in which it hydraulically locks the associated cylinder and isolates its supply and exhaust branches from each other. The cylinder 13 is of the single-acting type, and therefore, as its distributing valve 16 is shifted to the right and left from the illustrated neutral position, it progressively connects working space 13a with the supply branch 19a and the exhaust branch 21a, respectively. Distributing valves 17 and 18, on the other hand, control double-acting cylinders. Therefore, as each of these valves is shifted to the right from neutral position, it opens a supply path between its supply branch 19b or 19c and the head end cylinder space 14a or 15a and an exhaust path between the rod end space 14b or 15b and the associated exhaust branch 21b or 21c, and, when shifted in the opposite direction, reverses the connections between the cylinder spaces and the supply and exhaust branches.

The delivery rate-controlling device in the illustrated system is a by-pass valve 22 which is designed to progressively open and close a vent path leading from supply conduit 19 to tank 12. The valve 22, which is biased toward closed position by a spring 23, is positioned by a servo control that responds to movement of the distributing valves 16–18; the control being so arranged that as valve 16 is shifted to the right from neutral position, or valves 17 and 18 are shifted in either direction from neutral position, by-pass valve 22 is moved in the closing direction. The servo control comprises a hydraulic Wheatstone bridge having a pair of input junctions 24 and 25 which are connected, respectively, with pump 11 and tank 12, a pair of output junctions 26 and 27 which are connected, respectively, with a pair of opposed fluid pressure motors 28 and 29 that shift by-pass valve 22, and four conduit legs 31–34 which interconnect these junctions. Bridge leg 31 includes a common portion defined by supply conduit 19, a second common portion 31d, and three interconnecting, parallel command branches, each of which comprises one of the supply branches 19a, 19b or 19c and one of the conduits 31a, 31b and 31c. The command branches contain variable command orifices 35, 36 and 37, respectively, whose flow areas vary with movement of the distributing valves 16–18. Command orifice 35 is closed when valve 16 is in neutral position, or in any position to the left of neutral, and is opened progressively as the valve is moved to the right from neutral. Command orifices 36 and 37 also are closed when the associated distributing valves 17 and 18 are in neutral position, but, in each case, the orifice is opened progressively as the valve is shifted in either direction from neutral.

Bridge leg 32 contains a variable feedback orifice 38 whose flow area varies in response to movement of by-pass valve 22, and which serves to re-balance the bridge after it has been unbalanced by opening of one of the command orifices. The feedback orifice is so designed that it opens as the by-pass valve opens. The remaining legs 33 and 34 of the Wheatstone bridge are provided with fixed reference orifices 39 and 41, respectively. It is assumed herein that motors 28 and 29 have equal effective areas; therefore, orifices 39 and 41 are so sized that the servo control tends to maintain the ratio of orifice 39 to the flow area of feedback orifice 38 substantially equal to the ratio of the flow area of the command orifice 35, 36 or 37 to the flow area of orifice 41. Of course, full equality of these ratios cannot be realized because the bias exerted by spring 23 does vary with the position of by-pass valve 22.

The common portion 31d of the command leg 31 of the Wheatstone bridge contains an auxiliary variable orifice 42 which serves as the pilot stage of a relief valve whose second stage is the by-pass valve 22. The flow area of orifice 42 is controlled by a pressure motor 43 which responds to the pressure in supply conduit 19, and which is opposed by a biasing spring 44. The orifice 42 is intended to unbalance the Wheatstone bridge in a sense that causes by-pass valve 22 to open as the pressure in conduit 19 rises above the desired maximum value. Thus, in an installation wherein the command orifices 35–37 are in parallel leg branches, the auxiliary orifice 42 is connected in series with these branches and is biased open by its biasing spring.

The system described thus far follows the teachings of Pat. No. 3, 411,295, and, in the absence of the present improvement, it would deliver fluid to each of the cylinders 13–15 at a rate limited only by the capacity of supply pump 11. The improvement now to be described is employed to insure that cylinder 13 receives the full output of pump 11, that the maximum flow rate to cylinder 14 is limited to a relatively low value, and the maximum flow rate to cylinder 15 is limited to a value intermediate the corresponding values for the other cylinders. The rate of supply to cylinder 14 is limited by a control which comprises a reference orifice 45 located in the supply branch 19b leading to distributing valve 17, and a second variable auxiliary orifice 46 which is located in the common portion 31d of bridge leg 31, and which is controlled in accordance with the pressure differential across the reference orifice. The auxiliary orifice 46 is intended to unbalance the Wheatstone bridge in a sense that effects opening of by-pass valve 22 as the flow rate to valve 17 exceeds the selected limit; therefore, the orifice is connected in series with the parallel-connected command orifices 35–37 and is biased open by a spring 47. A pair of opposed motors 48 and 49, which respond, respectively, to the pressures upstream and downstream of reference orifice 45, shift auxiliary orifice 46 in the closing direction as the supply rate to the distributing valve 17 tends to exceed the set limit. This limit, of course, can be adjusted by changing the size of reference orifice 45.

The flow rate-limiting mechanism for cylinder 15 includes the reference orifice 45 and auxiliary orifice 46, just mentioned, as well as a seond reference orifice 51 located in supply branch 19c, and a conduit 52 which interconnects the downstream sides of the two reference orifices. This conduit 52 contains a blocking valve which prevents flow from branch 19c to branch 19b at least when distributing valve 17 is in one of its cylinder-actuating positions. Preferably, the blocking valve takes the form of a check valve 53. Since the supply path to distributing valve 18 includes the two branches 19b and 19c connected in parallel, the supply rate to this valve is, in effect, sensed by a reference orifice whose flow area is greater than that of either of the orifices 45 and 51. This means that the pressure differential required to actuate auxiliary orifice 46 will correspond to a higher flow rate when cylinder 15 is being actuated than when cylinder 14 is being actuated. As a result, a single auxiliary orifice 46 and its associated operating mechanism 47–49 can be used to establish two different maximum flow rates. Although it should be obvious, I will mention that the orifice-actuating motor 49 must be connected with the circuit at a point between the downstream side of the common reference orifice, here orifice 45, and the check valve 53, and not at the downstream side of the check valve.

When the illustrated system is in operation, and distributing valves 16–18 are in their neutral positions, the command orifices 35–37 are closed, and feedback orifice 38 is open. Consequently, the pressure at output junction 27 will be higher than the pressure at junction 26, and motor 29 will hold by-pass valve 22 in the illustrated position in which pump 11 is in substantially free communication with tank 12. It will be noted that, since by-pass valve 22 is biased closed by spring 23, it will restrict the unloading path and maintain the pressure at junction 24 slightly higher, for example 40 p.s.i. higher, than the pressure at junction 25. While this means that pump 11 will be loaded slightly, this is unavoidable because a minimum pressure of this magnitude must be maintained in order to insure that motor 28 will be able to shift by-pass valve 22 in the closing direction when one of the command orifices is subsequently opened.

When the operator shifts distributing valve 16 to the right to extend cylinder 13, command orifice 35 is gradually opened, and oil is allowed to flow through bridge leg 31 to output junction 26. This raises the pressure at the junction and causes motor 28 to move by-pass valve 22 in the closing direction. As the by-pass valve moves, feedback orifice 38 is gradually closed to thereby effect a progressive increase in the pressure at output junction 27. When the pressure at junction 27 reaches a level at which motor 29 balances the combined forces of spring 23 and motor 28, the bridge will again be in balance, and valve 22 will come to rest. The new position of valve 22 will correspond to the present position of distributing valve 16. During the closing movement of valve 42, the pressure at input junction 24, and in supply passage 19, rises. When this pressure exceeds the "break away" pressure of cylinder 13, i.e., the pressure required to overcome static friction and inertia, the cylinder will commence to move in the extending direction. Although this movement will be accompanied by a sudden decrease in the pressure at junction 24, this will have no effect upon the position of by-pass valve 22 because the pressures at output junctions 26 and 27 will change equal amounts.

In order to increase the speed of movement of cylinder 13, the operator will shift valve 16 further to the right. This movement increases the flow area of command orifice 35 and raises the pressure at output junction 26. As a result, motor 28 will move by-pass valve 22 to a new position in which it restricts to a greater degree the unloading path between pump 11 and tank 12, and thus causes a larger portion of the output of pump 11 to be delivered to cylinder 13. When the operator moves valve 16 to the limiting right-hand position, command orifice 35 will be fully open, and the pressure at output junction 26 will be a maximum. Under this condition, motor 28 will completely close by-pass valve 22 so that the full output of pump 11 will be delivered to cylinder 13.

If the operator now releases distributing valve 16 and thereby allows the centering spring to return it to neutral position, command orifices 35 will gradually close, and the pressure at output junction 26 will decrease. As a result, motor 29 will move by-pass valve 22 toward its open position. When valve 16 reaches its neutral position, by-pass valve 22 will have been shifted to its fully open position, and the pressure at junction 24 will again be at the minimum value established by spring 23.

Leftward shifting of valve 16 from its neutral position opens a vent path from the working space 13a of cylinder 13 to tank 12, but does not open command orifice 35. Therefore, during retraction of cylinder 13, by-pass valve 22 remains open, and pump 11 is not loaded beyond the minimum level prevailing in the neutral position.

Movement of distributing valve 17 in either direction from neutral position effects progressive opening of command orifice 36, and thus has the same effect upon by-pass valve 22 as rightward movement of distributing valve 16. In other words, as valve 17 moves away from the neutral position, by-pass valve 22 closes, and the supply rate to cylinder 14 increases. In this case, however, the invention is effective to limit the supply rate to a value less than the capacity of pump 11. At supply rates below the setting of the flow rate control, the pressure differential across reference orifice 45 will be insufficient to enable motors 48 and 49 to overcome the bias of spring 47; consequently, auxiliary orifice 46 will remain fully open, and by-pass valve 22 will be positioned exclusively in accordance with changes in the flow area of command orifice 36 (assuming that system pressure is below the setting of auxiliary orifice 42). If valve 17 is shifted beyond the position which produces the desired maximum supply rate, motors 48 and 49 will overpower spring 47 and commence to reduce the flow area of auxiliary orifice 46 as soon as the flow rate through reference orifice 45 exceeds the set value. Closure of orifice 46 restricts the flow of oil to junction 26 and accordingly causes the pressure at this point to decrease relatively to the pressure at junction 27. As a result, motor 29 will shift by-pass valve 22 in the opening direction and reduce the supply rate toward the set value. The flow area of orifice 46 will continue to decrease as long as the flow area of command orifice 36 continues to increase, with the result that the supply rate to cylinder 14 is held substantially constant at the desired limiting value even though valve 17 is moved all the way to one or the other of its limiting positions.

When distributing valve 18 is shifted away from its neutral position, command orifice 37 will open progressively to thereby cause by-pass valve 22 to move in the closing direction. Oil will be delivered to the valve through branch 19c and also through the parallel path provided by branch 19b and conduit 52. In this case, the motors 48 and 49 sense the pressures upstream and downstream, respectively, of the parallel-connected reference orifices 45 and 51, and therefore the pressure differential required to initiate closure of auxiliary orifice 46 will be produced at a higher flow rate than in the case of distributing valve 17. Thus, while the flow control will operate to limit supply rate in the same manner as that described earlier, the magnitude of this flow rate will be greater, although still less than the full output of pump 11.

Since the distributing valves 16–18 in FIG. 1 are connected in parallel, any two or all three can be operated at the same time. If valve 16 is at the left side of neutral when either of the other valves is actuated, each of the cylinders will operate as though the other were idle because command orifice 35 remains closed, and valve 16 draws no oil from the pump. On the other hand, if valve 16 is at the right side of neutral when another valve is actuated, or valve 16 is in neutral and the valves 17 and 18 are actuated, the cylinder requiring the lower actuating pressure will move first and, after this cylinder reaches the limit of its travel, the other cylinder will move. Since, in this case, two of the parallel-connected command orifices will be open, by-pass valve 22 will assume a position closer to the fully closed position than that called for by either of the distributing valves. In other words, the rate of delivery of oil will be determined by the joint effect of the two actuated valves, and not by the individual effect of either unit. In any event, the maximum supply rate to cylinder 13 will be limited only by the capacity of pump 11, and the maximum supply rates to cylinders 14 and 15 will be determined, respectively, by the reference orifice 45 and the combination of both of the reference orifices 45 and 51.

During any cylinder-actuating operation, other than merely retraction of cylinder 13, auxiliary orifice 42 is effective to limit system pressure to a predetermined maximum value. If the pressure exceeds the prescribed value, determined by the bias exerted by spring 44, motor 43 will commence to reduce the flow area of orifice 42 and thereby reduce the pressure at output junction 26. This, of course, enables motor 29 to shift by-pass valve 22 in the opening direction. The valve will continue to move in this direction as long as the flow area of orifices 42 is decreasing. The accompanying reduction in the delivery rate of oil to the distributing valves prevents supply pressure from rising above the allowable maximum. If the load on the active cylinder is large enough, orifice 42 will completely close, and by-pass valve 22 will move to the fully open position. As the load on the cylinder decreases, spring 44 will gradually increase the flow area of auxiliary orifice 42 and thereby effect an increase in the pressure at junction 26. Now motor 28 starts to move valve 22 in the closing direction. When the overload condition has abated, valve 22 will resume the position called for by the current settings of the command orifices and the auxiliary orifice 46.

As explained in application Ser. No. 642,436, the servo control for the delivery control device can take twelve different forms. The present invention can be incorporated in any one of these controls, provided that it is arranged to unbalance the bridge in a sense that effects a reduction in delivery rate as the pressure drop across the reference orifice or orifices tends to increase above the set value. In the case of the six controls in which the command orifices are connected in parallel, and consequently are closed when the distributing valves are in neutral position, the auxiliary orifice always is arranged in series with, and in the same leg of the bridge as, the command orifices, and the biasing spring 47 urges the orifice toward open position. This is illustrated generally by the schematics of FIGS. 2 and 3 which show the two possible locations of the command orifices relative to output junction 26. It should be noted that the auxiliary orifices 46 can be positioned either upstream or downstream of the command orifices. In the other six controls, the command orifices are in series with each other, and therefore they are open when the distributing valves are in neutral position. Here, the auxiliary orifice 46 always is located in a parallel branch of the command leg and is biased closed. The two possibilities for this arrangement are depicted in the general schematics of FIGS. 4 and 5. In all cases, it will be understood that the location and arrangement of the feed back orifice 38 has no effect upon the position of auxiliary orifice 46 or upon the direction of action of its biasing spring 47.

Although I have described in detail one representative embodiment of the inventive concept, it must be understood that the following claims provide the true measure of the scope of the invention.

What is claimed is:
1. In a hydraulic system including:
 (a) a source (11) of hydraulic fluid under pressure and a reservoir (12);
 (b) closed center distributing valve means (17) connected with the source and adapted to control a hydraulic motor (14), the valve means including a control member having a neutral position in which it causes the motor to be isolated from the source and being movable from that position to effect pro- it causes the motor to be isolated from the source and the motor;
 (c) control means (22) for varying the rate at which the source delivers fluid to the distributing valve means;
 (d) a balanced hydraulic Wheatstone bridge including a pair of input junctions (24, 25) connected, respectively, with the source and the reservoir, a pair of output junctions (26, 27), and four conduit legs 31–34) which interconnect the junctions and each of which contains a metering orifice (36, 38, 39, 41);
 (e) one (36) of said orifices, termed the command orifice, affording a flow area which varies in response to movement of the control member and serving to unbalance the bridge, and another (38) of said orifices, termed the feedback orifice, affording a flow area which varies in response to movement of the control means and serving to rebalance the bridge;
 (f) actuating means (28, 29) responsive to the pressures at the output junctions for operating the control means; and
 (g) means (23) for maintaining a minimum loading pressure on the source when the latter is delivering fluid at a minimum rate to the distributing valve means, the minimum pressure being adequate to enable the actuating means to operate the control means, the improvement which comprises:
  (1) a reference orifice (45) interposed in the connection (19b) between the source and the distributing valve means;
  (2) an auxiliary orifice (46) of the variable type connected in the same leg (31) of the Wheatstone bridge as the command orifice (36); and
  (3) orifice control means (47–49) for varying the flow area of the auxiliary orifice in response to changes in the pressure drop across the reference orifice,
  (4) the auxiliary orifice and its control means being so arranged that, as the pressure drop across the reference orifice tends to increase above a predetermined value, the auxiliary orifice unbalances the pressures at the output junctions (26, 27) of the bridge in a sense which causes the control means (22) to reduce said delivery rate.

2. The improved system defined in claim 1 wherein:
 (a) the flow area of the command orifice (36) is a minimum when the control member is in neutral position; and
 (b) the auxiliary orifice (46) is in series with the command orifice and its flow area is reduced by the orifice control means (47–49) as the pressure drop across the reference orifice (45) tends to rise above said predetermined value.

3. The improved system defined in claim 1 wherein:
 (a) the flow area of the command orifice (36) is a maximum when the control member is in neutral position; and
 (b) the auxiliary orifice (46) is in parallel with the command orifice and its flow area is increased by the orifice control means (47–49) as the pressure drop across the reference orifice (45) tends to increase above said predetermined value.

4. The improved system defined in claim 1 which includes:
 (a) a second distributing valve means (18) of the type described in claim 1, and which is connected with the source in parallel with the first valve means;
 (b) a second command orifice (37) connected in the same leg (31) of the bridge as the first such orifice (36) and controlled by the control member of the second distributing valve means (18); and
 (c) the further improvement which comprises:
  (1) a second reference orifice (51) interposed in the connection (19c) between the second distributing valve means (18) and the source,
  (2) a flow passage (52) interconnecting the downstream sides of the two reference orifices, and
  (3) blocking means (53) for preventing flow through the flow passage (52) toward the first distributing valve means (17) at least when the control member of that valve means is away from its neutral position.

5. The improved system defined in claim 4 wherein the blocking means (53) is a check valve.

6. The improved system defined in claim 4 wherein:
 (a) the command orifices (36, 37) are connected in parallel in said bridge leg (31), and the flow area of each is a minimum when the associated control member is in neutral position;

(b) the auxiliary orifice (46) is connected in series with the parallel-connected command orifices; and (c) the orifice control means (47–49) decreases the flow area of the auxiliary orifice as the pressure drop across the reference orifices (45, 51) tends to increase above said predetermined value.

7. The improved system defined in claim 4 wherein:

(a) the command orifices (36, 37) are connected in series in said bridge leg (31), and the flow area of each is a maximum when the associated control member is in neutral position;

(b) the auxiliary orifice (46) is connected in parallel with the two command orifices; and (c) the orifice control means (47–49) increases the flow area of the auxiliary orifice as the pressure drop across the reference orifices (45, 51) tends to increase above said predetermined value.

References Cited

UNITED STATES PATENTS

| | | | |
|---|---|---|---|
| 2,682,748 | 7/1954 | Ernst | 60—52 |
| 3,333,415 | 8/1967 | Adams | 60—52 |

ROBERT G. NILSON, Primary Examiner

U.S. Cl. X.R.

60—52; 91—450